(No Model.)
A. BERND.
SNAP HOOK.
No. 252,832.  Patented Jan. 24, 1882.
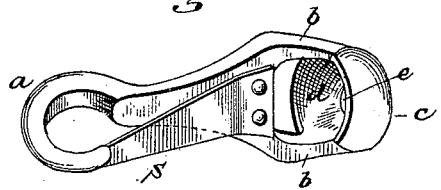
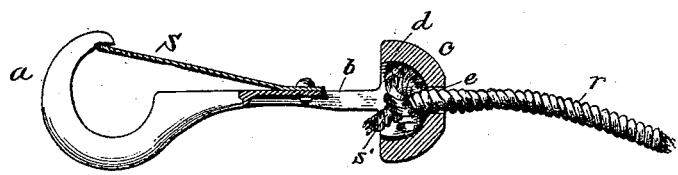
Witnesses:
A. M. Long.
A. M. Tanner
Inventor
Adolph Bernd
By Paine, Crofton & Lord
Attorneys.

UNITED STATES PATENT OFFICE.

ADOLPH BERND, OF MACON, GEORGIA, ASSIGNOR TO BERND BROTHERS, OF SAME PLACE.

SNAP-HOOK.

SPECIFICATION forming part of Letters Patent No. 252,832, dated January 24, 1882.

Application filed November 7, 1881. (No model.)

*To all whom it may concern:*

Be it known that I, ADOLPH BERND, of Macon, in the county of Bibb and State of Georgia, have invented a new and Improved Snap-Hook; and I do hereby declare the following to be a full and exact description of the same, reference being had to the accompanying drawings, forming part of this specification, in which—

Figure 1 is a side view of the hook, and Fig. 2 a longitudinal sectional view.

Similar letters of reference in the several figures denote the same part.

The present invention relates to that class of snap-hooks in which provision is made for retaining the end of the rope in a socket or cavity made in the base or body of the hook.

The object of my invention is to construct the body of the hook with a recess or socket of a peculiar formation, and to seat therein the knotted or enlarged end of a rope, so that the hook can swivel or turn on the rope without becoming disengaged therefrom.

To these ends the invention consists in the construction and combination of parts, which will first be fully described, and then set forth in the claim.

In the drawings, A represents the body of the hook, formed preferably of wrought metal, and of a size found most convenient. The outer end, $a$, of the hook is curved in the usual manner, and is adapted to co-operate with a spring-snap, $s$, riveted or otherwise secured to the shank of the hook, as shown. The shank of the hook beyond the rivet that holds the spring is bifurcated or divided into two portions, $b\ b$, and terminates in a conical head or boss, $c$. This head or boss is perforated longitudinally at $e$ for the passage of leather or other article, $r$, to which the hook is to be attached, and is chambered out at $d$ to form a hemispherical cavity, gradually increasing in diameter from the rope-opening $e$ to the upper end of said cavity, as is fully shown in Fig. 2.

The cavity or socket $d$ serves for the reception and retention of the knot or enlarged end $s'$ of the rope or other article, $r$, passed through the opening $e$, so that said knot or enlarged end will be held more securely, and, furthermore, will not project out between the divided portions $b\ b$ of the shank and destroy the neat appearance of the connections.

In securing the shank of the hook to the rope or other article the end of the latter is passed through the perforation $e$ in the head $c$, and out through the opening between the divided portions $b\ b$. The end of the rope is then knotted or otherwise enlarged, so as to form a knot or enlargement which, when pulled into the cavity or socket, will be of the same size or shape as the latter.

By forming the knot and its receiving-cavity in the way stated the hook can swivel or turn on the rope in the manner of a ball-and-socket joint. The line of draft is also made to pass directly through the longitudinal center of the shank, and there is consequently less liability for the hook to bend or break or to become unfastened.

I am aware that a snap-hook has been constructed with a square or rectangular opening for receiving the knotted end of a rope or other object; and I am also aware of the existence of a harness-link which is provided with a long tapering socket in which a rope-trace is firmly wedged.

It will readily be perceived that my invention differs from the above, because I provide a shallow conical cavity with beveled or rounded walls; or, in other words, the cavity is of a hemispherical shape, or of a form approximating thereto. The knot or enlargement of the rope just fills said cavity and is of the same shape as the latter. In this manner I attain all the advantages of the well-known swivel snap-hook without making use of any devices but a knotted rope and a snap-hook having a cavity in the base of its body portion.

Having thus described my invention, what I claim as new, and desire to secure by Letters Patent, is—

The snap-hook herein described, comprising a body or hook portion having branching arms and a head or base portion provided with a hemispherical cavity, and an opening at the bottom of said cavity adapted to receive a knotted rope and allow it to turn freely thereon, all substantially as herein set forth.

In testimony whereof I affix my signature in presence of two witnesses.

ADOLPH BERND.

Witnesses:
ISAAC FLATAU,
J. W. CABANISS.